US011048635B2

(12) United States Patent
Bradbury et al.

(10) Patent No.: US 11,048,635 B2
(45) Date of Patent: *Jun. 29, 2021

(54) CONTROLLING A RATE OF PREFETCHING BASED ON BUS BANDWIDTH

(71) Applicant: INTERNATIONAL BUSINESS MACHINES CORPORATION, Armonk, NY (US)

(72) Inventors: Jonathan D. Bradbury, Poughkeepsie, NY (US); Michael K. Gschwind, Chappaqua, NY (US); Christian Jacobi, West Park, NY (US); Chung-Lung K. Shum, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/752,783

(22) Filed: Jan. 27, 2020

(65) Prior Publication Data

US 2020/0159663 A1 May 21, 2020

Related U.S. Application Data

(63) Continuation of application No. 15/701,508, filed on Sep. 12, 2017, now Pat. No. 10,657,059.

(51) Int. Cl.
*G06F 12/0862* (2016.01)
*G06F 12/0811* (2016.01)
*G06F 13/16* (2006.01)
*G06F 12/084* (2016.01)
*G06F 11/30* (2006.01)

(52) U.S. Cl.
CPC ........ *G06F 12/0862* (2013.01); *G06F 12/084* (2013.01); *G06F 12/0811* (2013.01); *G06F 13/1668* (2013.01); *G06F 11/3027* (2013.01)

(58) Field of Classification Search
None
See application file for complete search history.

(56) References Cited

U.S. PATENT DOCUMENTS

| 7,350,029 B2 | 3/2008 | Fluhr et al. |
| 8,543,767 B2 | 9/2013 | Bell et al. |

(Continued)

FOREIGN PATENT DOCUMENTS

CN 102184151 A 9/2011

OTHER PUBLICATIONS

IBM, "z/Architecture-Principles of Operation," IBM Publication No. SA22-7832-10, 11th Edition, Mar. 2015, pp. 1-1732.

(Continued)

*Primary Examiner* — Gary W. Cygiel
(74) *Attorney, Agent, or Firm* — Steven Chiu, Esq.; Heslin Rothenberg Farley & Mesiti P.C.

(57) ABSTRACT

Controlling a rate of prefetching based on bus bandwidth. A determination is made as to whether a rate of prefetching data from memory into a cache is to be changed. This determination is based on bus utilization, and includes identifying a most utilized bus of a plurality of buses used for the prefetch of data, and monitoring utilization of the most utilized bus. The determination whether the rate of prefetching is to be changed is based on the monitoring. Based on determining that the rate is to be changed, the rate of prefetching is changed.

20 Claims, 10 Drawing Sheets

(56) References Cited

U.S. PATENT DOCUMENTS

| | | |
|---|---|---|
| 2004/0148470 A1 | 7/2004 | Schultz |
| 2004/0268050 A1 | 12/2004 | Cai et al. |
| 2008/0183903 A1 | 7/2008 | Banstee et al. |
| 2012/0246506 A1 | 9/2012 | Bell et al. |
| 2012/0324472 A1 | 12/2012 | Rossbach et al. |
| 2014/0310479 A1 | 10/2014 | Hooker et al. |
| 2018/0165238 A1 | 6/2018 | Depew et al. |
| 2019/0079871 A1 | 3/2019 | Bradbury et al. |
| 2019/0079872 A1 | 3/2019 | Bradbury et al. |

OTHER PUBLICATIONS

IBM, "Power ISA—V2.07B," Apr. 9, 2015, pp. 1-1527.
Zhuang, Xiaotong et al., "Reducing Cache Pollution via Dynamic Data Prefetching Filtering," IEEE Transactions on Computers, vol. 56, No. 1, Jan. 2007, pp. 18-31.
Ebrahim, Eiman et al., "Coordinated Control of Multiple Prefetchers in Multi-Core Systems," MICRO '09, Dec. 2009, pp. 1-11.
IBM, "Method for Improving Peripheral Component Interconnect Bus Bandwidth for Systems with Limited Prefetch," IP.com No. 000118368, Jan. 1997, pp. 23-26 (+ cover).
Anonymous, "Method for Hierarchical Data Prefetching on a Memory Hierarchy," IP.com No. 000029127, (no late information available), pp. 1-4 (+ cover).
Bradbury et al., "List of IBM Patents and/or Patent Applications Treated as Related", U.S. Appl. No. 16/752,783, filed Jan. 27, 2020, dated Jan. 27, 2020 (2 pages).
Reply to EESR for EP Application No. EP 18855663.3, filed Feb. 2, 2021 (33 pages).

```
┌─────────────────────────────────────────────────────────────────────────┐
│  ┌───────────────────────────────────────────────────────────────┐      │
│  │ DETERMINE WHETHER A RATE OF PREFETCHING OF DATA FROM MEMORY INTO│     │
│  │ A CACHE IS TO BE CHANGED ~600                                  │     │
│  │                                                                │     │
│  │   THE DETERMINING BEING BASED ON BUS UTILIZATION ~602          │     │
│  │                                                                │     │
│  │ CHANGE THE RATE OF PREFETCHING, BASED ON DETERMINING THAT THE RATE│  │
│  │ IS TO BE CHANGED ~604                                          │     │
│  └───────────────────────────────────────────────────────────────┘      │
│                                                                         │
│  ┌───────────────────────────────────────────────────────────────┐      │
│  │ THE CHANGING THE RATE OF PREFETCHING INCLUDES, E.G., SLOWING THE│    │
│  │ RATE OF PREFETCHING ~606                                       │     │
│  │                                                                │     │
│  │ THE CHANGING THE RATE OF PREFETCHING INCLUDES, E.G., INCREASING THE│ │
│  │ RATE OF PREFETCHING ~608                                       │     │
│  └───────────────────────────────────────────────────────────────┘      │
│                                                                         │
│  ┌───────────────────────────────────────────────────────────────┐      │
│  │ THE CHANGING THE RATE OF PREFETCHING INCLUDES, E.G.:           │     │
│  │                                                                │     │
│  │    RECEIVING A PREFETCH REQUEST AT A CACHE HIERARCHY HAVING A  │     │
│  │    PLURALITY OF LEVELS OF CACHE ~610              ┌612         │     │
│  │                                                                │     │
│  │    BLOCKING THE PREFETCH REQUEST FROM BEING SENT TO ONE OR     │     │
│  │    MORE LEVELS OF CACHE OF THE PLURALITY OF LEVELS OF CACHE    │     │
│  └───────────────────────────────────────────────────────────────┘      │
│                                                                         │
│  ┌───────────────────────────────────────────────────────────────┐      │
│  │ THE BLOCKING INCLUDES BLOCKING THE PREFETCH REQUEST FROM BEING │      │
│  │ SENT FROM A PRIVATE LEVEL CACHE TO A SHARED LEVEL CACHE OF THE │      │
│  │ PLURALITY OF LEVELS OF CACHE ~614                              │      │
│  └───────────────────────────────────────────────────────────────┘      │
└─────────────────────────────────────────────────────────────────────────┘
```

FIG. 6A

THE DETERMINING WHETHER A RATE OF PREFETCHING OF DATA FROM MEMORY INTO A CACHE IS TO BE CHANGED INCLUDES

OBTAINING AN INDICATION OF A SELECTED BUS USED IN THE PREFETCHING OF DATA TO BE MONITORED —620

MONITORING UTILIZATION OF THE SELECTED BUS —622

DETERMINING WHETHER THE RATE OF PREFETCHING IS TO BE CHANGED BASED ON THE MONITORING —624

THE SELECTED BUS IS A BUS DETERMINED TO BE MOST UTILIZED IN THE PREFETCH OF DATA FOR A PARTICULAR REQUEST —626

THE MONITORING IS PERFORMED FOR A SELECTED NUMBER OF PREFETCH REQUESTS —628

THE MONITORING INCLUDES OBTAINING INFORMATION RELATING TO UTILIZATION —630

THE INFORMATION INCLUDES, E.G., AN INDICATION OF BUS UTILIZATION FOR PREFETCH REQUESTS —632

THE INFORMATION INCLUDES, E.G., AN INDICATION OF BUS UTILIZATION FOR DEMAND REQUESTS —634

FIG. 6B

CONTROLLING A RATE OF PREFETCHING BASED ON BUS BANDWIDTH

CROSS-REFERENCE TO RELATED APPLICATIONS

This application is a continuation of U.S. patent application Ser. No. 15/701,508, filed Sep. 12, 2017, entitled, "Controlling A Rate Of Prefetching Based On A Bus Bandwidth," which was published on Mar. 14, 2019, as U.S. Patent Publication No. 2019/0079871 A1, and which is hereby incorporated herein by reference in its entirety.

BACKGROUND

One or more aspects relate, in general, to processing within a computing environment, and in particular, to facilitating such processing.

Processing within computing environments is enhanced by using a memory hierarchy to store and retrieve data. Typically, a memory hierarchy includes main memory (also referred to as memory) and a cache hierarchy. The cache hierarchy includes multiple levels of data caches, such as, for instance, one or more private level caches (L1, L2) and at least one higher level shared cache (e.g., L3, L4).

Applications operating on large amounts of in-memory data typically waste much of their time waiting for data to be transferred from memory, through the cache hierarchy, to the L1 data cache before it can be processed. That is, when there is a request for data, an attempt is made to retrieve the data from the cache. If the data is not in the cache (i.e., a cache miss), it is retrieved from memory. To minimize this time, and to improve performance, prefetching of data from memory into the L1 cache is employed.

Aggressive prefetching can improve performance by avoiding cache miss penalties when an application eventually needs the data. The prefetcher brings data into the cache ahead of time so that no or less penalty is incurred upon actual data usage by the processor. On the other hand, prefetching too aggressively can cause increased bus utilization, which leads to performance degradation, in particular in multiprocessor, multi-chip and multi-node systems.

SUMMARY

Shortcomings of the prior art are overcome and additional advantages are provided through the provision of a computer-implemented method of facilitating processing within a computing environment. The method includes, for instance, determining whether a rate of prefetching of data from memory into a cache is to be changed. The determining is based on bus utilization, and includes identifying a most utilized bus of a plurality of buses used for the prefetch of data, and monitoring utilization of the most utilized bus. The determination whether the rate of prefetching is to be changed is based on the monitoring. Based on determining that the rate is to be changed, the rate of prefetching is changed.

Computer program products and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 6A-6B depict one embodiment of facilitating processing within a computing environment, in accordance with an aspect of the present invention;

DETAILED DESCRIPTION

In accordance with one or more aspects, a capability is provided to control prefetching of data from memory into a selected cache. For instance, a capability is provided to control the rate of prefetching (or how aggressively prefetching is performed) based on monitored information, such as available bus bandwidth.

Figure 1A:
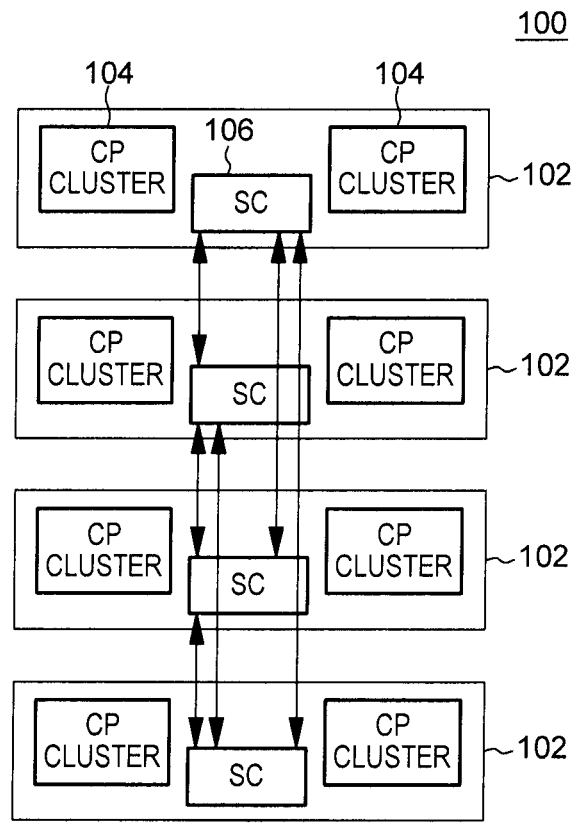
FIG. 1A depicts one example of a computing environment to incorporate and use one or more aspects of the present invention.

One example of a computing environment to incorporate and use one or more aspects of the present invention is described with reference to FIG. 1A. In one example, a computing environment 100 is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment may be based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1B:
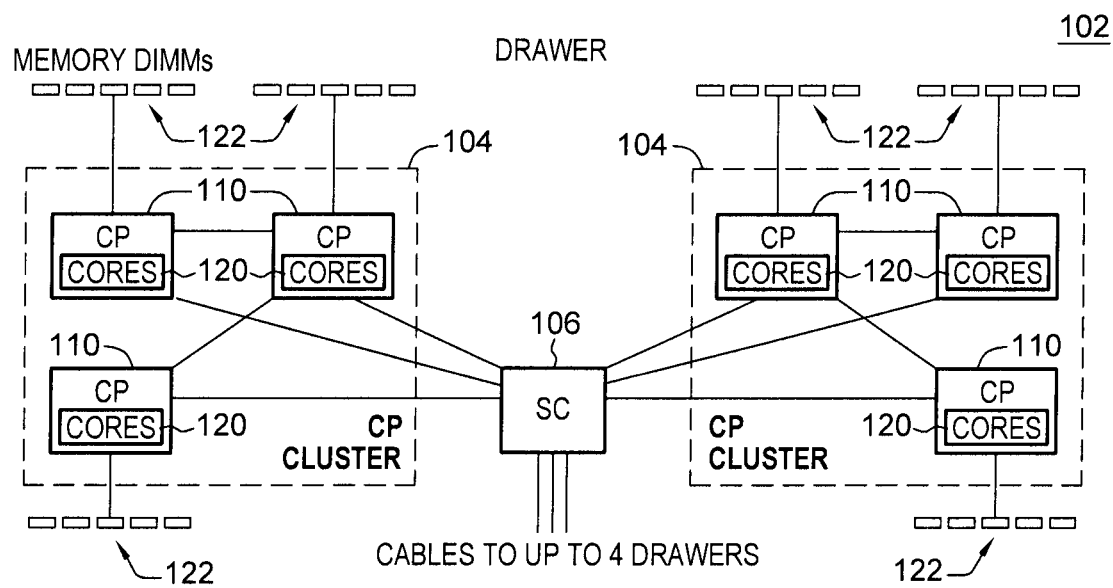
FIG. 1B depicts further details of a drawer of FIG. 1A, in accordance with an aspect of the present invention.

In one example, computing environment 100 includes a plurality of drawers 102. A drawer includes one or more central processing (CP) clusters 104 (also referred to as nodes) and a system controller (SC) 106 (e.g., SC chip). The system controller interconnects drawers 102, and may be separate from and/or part of one or more of the CP clusters. Further details regarding drawer 102 are described with reference to FIG. 1B.

As shown, in one example, drawer 102 includes a plurality of (e.g., 2) central processing clusters 104. A central processing cluster 104 includes a plurality of central processor chips 110, each of which is coupled to system controller 106. A central processor chip 110 includes one or more cores 120 (also referred to as processors or central processing units (CPUs)), such as, e.g., eight cores per chip. Moreover, in one example, central processor chip 110 is coupled to, e.g., one or more dual in-line memory modules (DIMMs) 122 providing memory for use by CP cluster 104.

Figure 2:
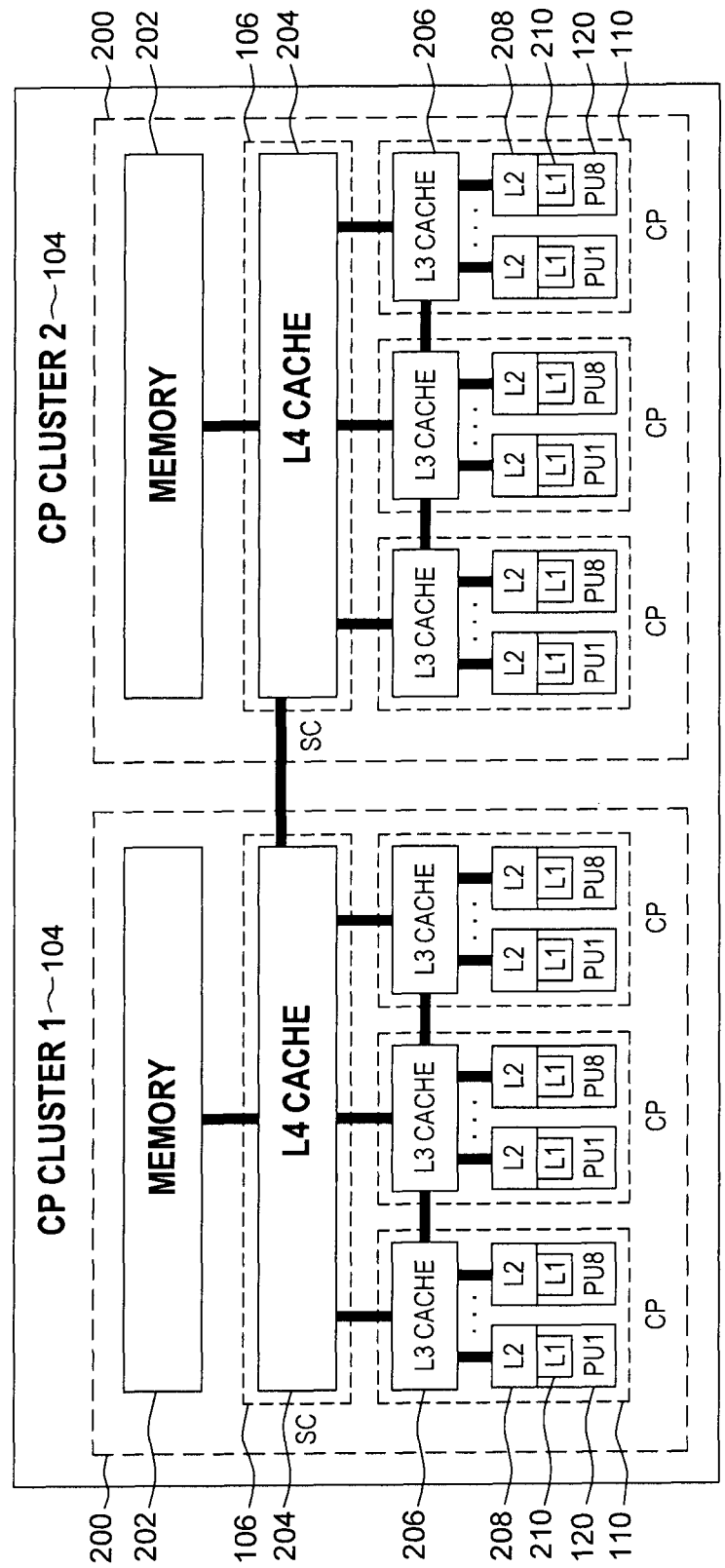
FIG. 2 depicts one example of a memory hierarchy of a drawer of FIG. 1A, in accordance with an aspect of the present invention.

CP cluster 104 uses main memory, as well as memory caches, to facilitate processing. One example of a memory hierarchy employed by CP cluster 104 is described with reference to FIG. 2. In one example, a memory hierarchy 200, includes a main memory 202; a shared L4 cache 204; one or more shared L3 caches 206; one or more private L2 caches 208; and one or more private L1 caches 210 in a processor 120. In this example implementation, L4 cache 204 is part of system controller 106, which provides connectivity to the other drawers. Although an example memory hierarchy is described herein, other examples are possible.

Figure 3:
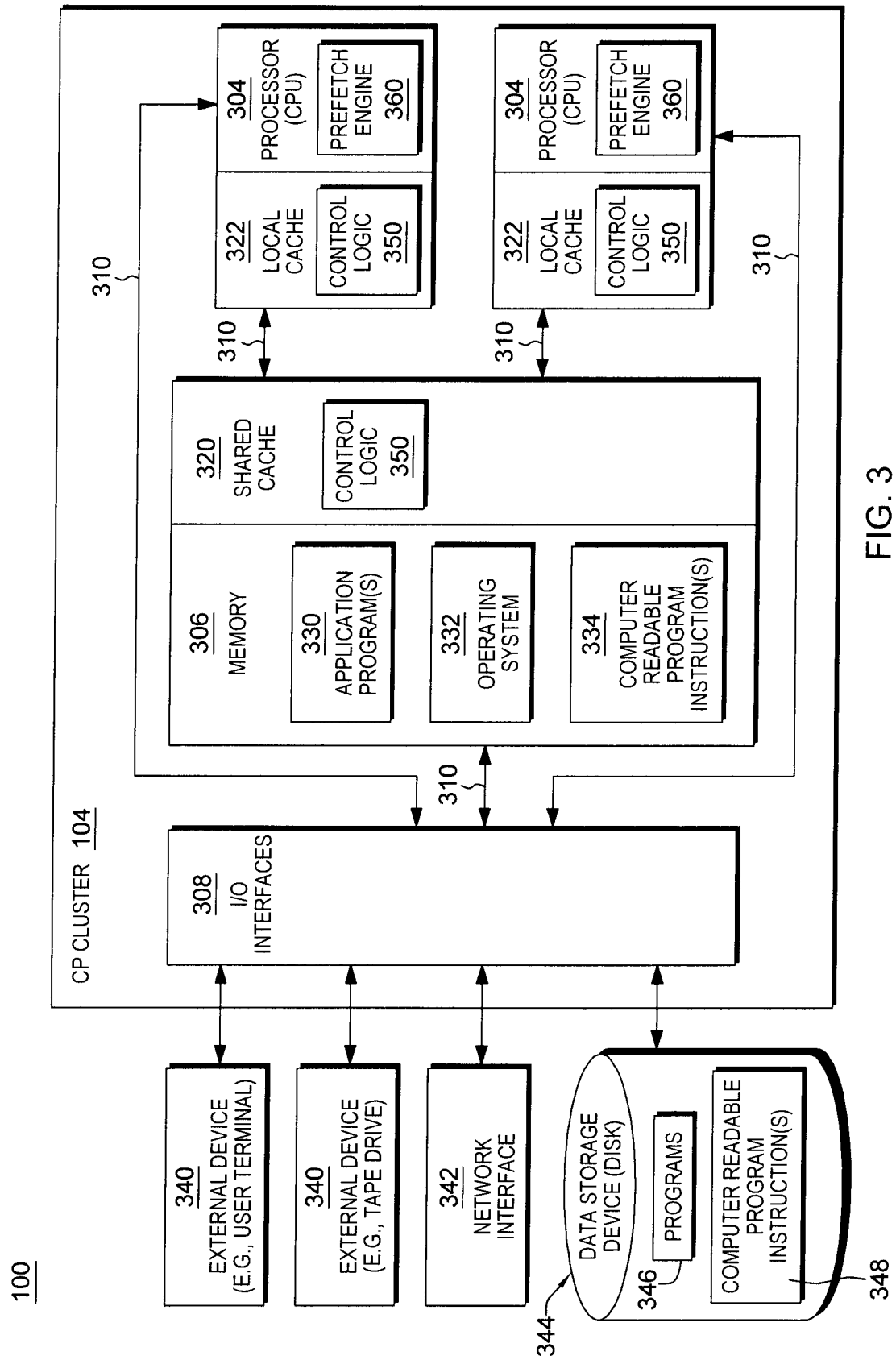
FIG. 3 depicts further details of a computing environment to incorporate and use one or more aspects of the present invention.

Further details regarding one example of CP cluster 104 are described with reference to FIG. 3. CP cluster 104 is shown, in one example, in the form of a general-purpose computing device. CP cluster 104 may include, but is not limited to, one or more processors or processing units 304 (e.g., core 120), a memory 306 (referred to as main memory or storage, as examples; e.g., memory 202), and one or more input/output (I/O) interfaces 308, coupled to one another via one or more buses and/or other connections 310.

Bus 310 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 306 may include and/or be coupled to, for instance, a cache 320, such as a shared cache (e.g., L4 cache 204 and/or L3 cache 206), which may be coupled to local caches 322 (e.g., L2 cache 208 and/or L1 cache 210) of processors 304. Each cache may include control logic 350 used in accordance with an aspect of the present invention, as described below. Additionally, a processor may have a prefetch engine 360 used in prefetching data from memory into one or more selected caches.

Further, memory 306 may include one or more programs or applications 330, an operating system 332, and one or more computer readable program instructions 334. Computer readable program instructions 334 may be configured to carry out functions of embodiments of aspects of the invention.

CP cluster 104 may also communicate via, e.g., I/O interfaces 308 with one or more external devices 340, one or more network interfaces 342, and/or one or more data storage devices 344. Example external devices include a user terminal, a tape drive, a pointing device, a display, etc. Network interface 342 enables CP cluster 104 to communicate with one or more networks, such as a local area network (LAN), a general wide area network (WAN), and/or a public network (e.g., the Internet), providing communication with other computing devices or systems.

Data storage device 344 may store one or more programs 346, one or more computer readable program instructions 348, and/or data, etc. The computer readable program instructions may be configured to carry out functions of embodiments of aspects of the invention.

CP cluster 104 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with CP cluster 104. Examples, include, but are not limited to: microcode, device drivers, redundant processing units, external disk drive arrays, RAID systems, tape drives, and data archival storage systems, etc.

CP cluster 104 may be operational with numerous other general purpose or special purpose computing system environments or configurations. Examples of well-known computing systems, environments, and/or configurations that may be suitable for use with CP cluster 104 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

One or more shared caches 320 (e.g., L4 cache 204 and/or L3 cache 206) and/or one or more local caches 322 (e.g., L2 cache 208 and/or L1 cache 210) are part of a cache hierarchy that includes a complex system of buses interconnecting the processors, the chips, the CP clusters and one or more memory controllers in a multi-node system. The cache hierarchy includes control logic 350 which, in accordance with an aspect of the present invention, monitors bus utilization on each of those buses (or selected buses, in another example) and differentiates the utilization due to demand fetches versus prefetches. Such a utilization measurement can be performed by counting transferred data bytes per milliseconds, or transactions per milliseconds, etc., and comparing that number to the maximum bandwidth of the bus. Processors can issue prefetches based on various prefetch techniques. Prefetch requests are broadcast through the cache hierarchy. Depending on where the data is sourced from (e.g., other chip's cache, memory controller, etc.), different buses are used in that transfer. The cache hierarchy records the most-utilized (also referred to as a max-utilized) bus employed in a particular prefetch, and returns an indication of this most-utilized bus to the processor, along with the prefetched data. For example, the most utilized bus employed in the transaction might have a 75% demand and 15% prefetch utilization (i.e., 10% idle bandwidth), and both numbers (e.g., 75% and 15%) are returned to the requesting processor.

In one embodiment, the processor that creates a prefetch request monitors the bandwidth of, for instance, the most utilized bus over a series of prefetches. (In another embodiment, the bandwidth of all the buses along the path are monitored, or one or more selected buses are monitored.) Based on the recent average max utilization encountered, the prefetching engine can change (e.g., reduce or increase) its rate of prefetch. For example, in a prefetch engine with three aggressiveness levels (low, middle, high), the following technique may be used: If the last 10 prefetches on average encountered demand utilization below 20% and prefetch plus demand utilization below 50%, the rate of prefetching is increased from low→middle or middle→high, depending on the current rate of prefetching. If the last 10 prefetches on average encountered demand utilization above 50%, or prefetch plus demand utilization above 70%, the rate of prefetching is decreased from middle→low or high-→middle, depending on the current rate of prefetching. Otherwise, the current rate of prefetching is maintained. Other examples also exist.

Further details regarding controlling a rate of prefetching (or aggressiveness) based on information relating to available bus bandwidth, in accordance with an aspect of the present invention, are described with reference to FIGS. 4-5. For instance, one example of obtaining bus utilization information is described with reference to FIG. 4, and one example of using the information to control a rate of prefetching is described with reference to FIG. 5.

Figure 4:
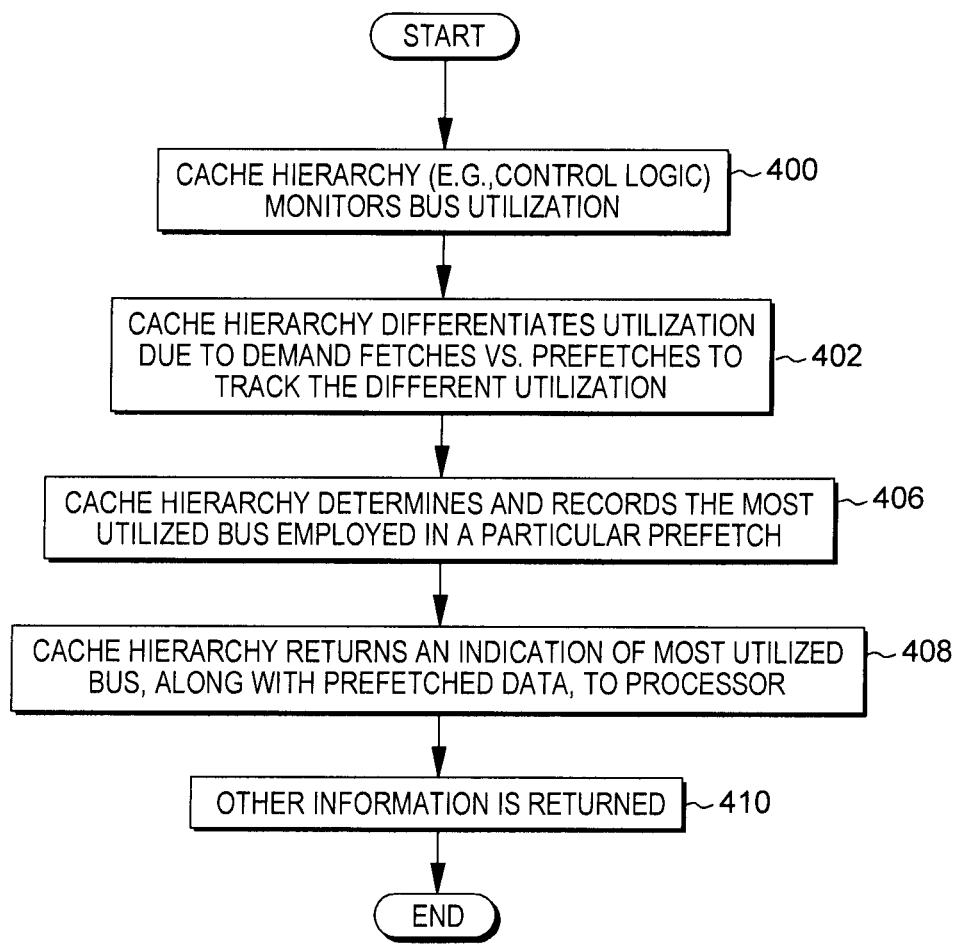
FIG. 4 depicts one embodiment of processing associated with determining the most utilized bus of a prefetch request and returning that information to a processor, in accordance with an aspect of the present invention.

Referring initially to FIG. 4, based on a request received from a processor to retrieve data, the cache hierarchy monitors bus utilization of one or more buses used for the request, STEP 400. For example, the control logic within each cache or within selected caches measures utilization of each bus used to retrieve the data by, for instance, counting transferred data bytes per milliseconds, or transactions per milliseconds, etc. and comparing that number to the maximum bandwidth of the bus. In one example, the cache hierarchy differentiates utilization due to demand fetches or prefetches to track the different utilization, STEP 402. This may be determined based on the fetch command, itself, that indicates if it is a demand request or a prefetch request.

Further, in one example, a determination is made of the most utilized bus used in prefetching the requested data (or in another example, the most utilized bus used for prefetch and demand requests), STEP 406. In one example, prefetch requests broadcast through the cache hierarchy, and depending from where the data is sourced, e.g., other chip's cache, memory controller, etc., different buses are used in that transfer. For those used buses, the cache hierarchy determines and records the most utilized (also referred to as the max utilized) bus. An indication of the most utilized bus (e.g., a number, a name and/or other identifier) is returned to the processor requesting the data, along with the prefetched data, in one example, STEP 408. Additionally, other information may be obtained and forwarded to the processor, such as an indication of demand and/or of prefetch utilization, STEP 410. For example, the most utilized bus employed in the transaction might have a 75% demand and 15% prefetch utilization (i.e., 10% idle bandwidth), and both numbers (e.g., 75% and 15%) are returned to the requesting processor. The processor obtains this data and processes it, as described below with reference to FIG. 5.

Figure 5:
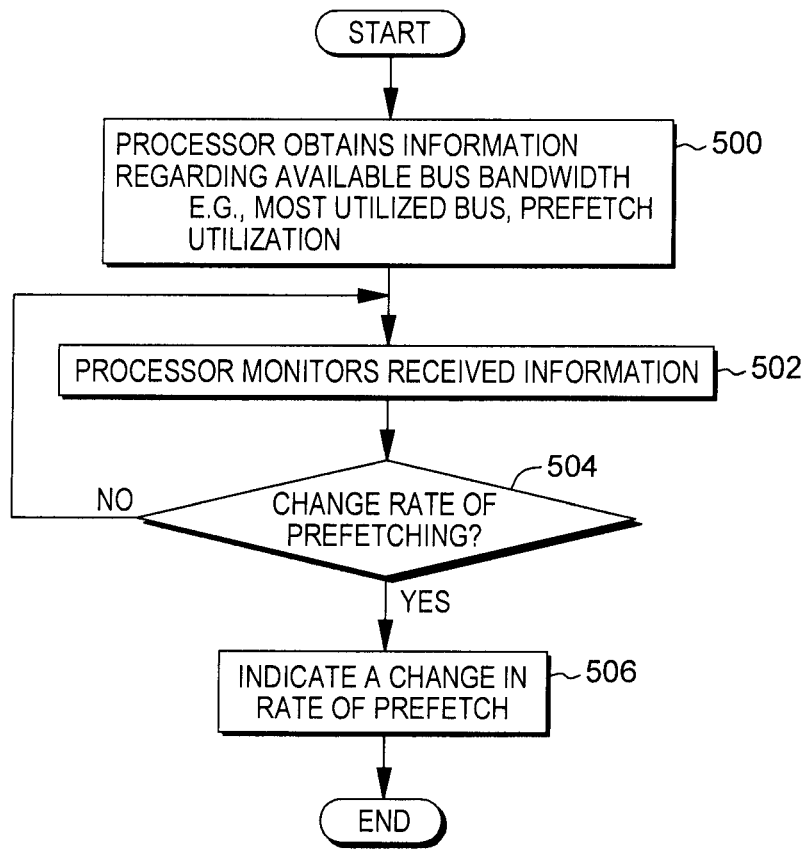
FIG. 5 depicts one embodiment of processing associated with controlling a rate of prefetching, in accordance with an aspect of the present invention.

Referring to FIG. 5, in one example, the requesting processor obtains the information regarding the available bus bandwidth, including, for instance, the most utilized bus, prefetch utilization, etc., STEP 500. The processor monitors utilization (e.g., based on information returned from the cache hierarchy) of the most-utilized bus over a series of prefetches (e.g., 10; the number of prefetches to be monitored is selectable), STEP 502. Based on this monitoring, the processor determines whether an action is to be taken, such as changing the rate of prefetching, INQUIRY 504. For instance, the processor determines, for the most-utilized bus, the average max utilization over the selected number of prefetches, and determines whether a rate of prefetching should be changed. If it is determined that the rate of prefetching is not to be changed, then the processor continues to monitor, STEP 502. However, if it is determined that a change to the rate of prefetching is to be performed, then processing continues to STEP 506, in which the processor indicates to the prefetching engine that a change in the rate of prefetching is to occur. As one example, in a prefetch engine with three aggressiveness levels (low, middle, high), the following technique may be used: If the last 10 prefetches on average encountered demand utilization below 20% and prefetch plus demand utilization below 50%, the rate of prefetching is increased from low→middle or middle→high, depending on the current rate of prefetching. If the last 10 prefetches on average encountered demand utilization above 50%, or prefetch plus demand utilization above 70%, the rate of prefetch is decreased from middle→low or high→middle, depending on the current rate of prefetching. Otherwise, the current rate of prefetching is maintained. Other examples are also possible.

In another example, the changing the rate of prefetching includes allowing prefetches to be sent from the processor into the cache hierarchy, and then, blocking requests in the cache hierarchy. For instance, requests may be blocked by the last level of private caches (e.g., L2) from being sent to a first level of shared caches (e.g., L3) to avoid bandwidth over usage, based on an aggressiveness level reported by the processor with the prefetch request. As a further example, requests may be blocked from a first level of shared cache (e.g., L3) to a higher level of shared cache (e.g., L4). Other variations are also possible.

Described herein is a capability to control a rate of prefetching based on bus utilization. By controlling the rate of prefetching, processing is facilitated and performance may be improved by controlling the bandwidth on buses used in the prefetching. By focusing on the most-utilized bus, processing is further facilitated by limiting the monitoring.

One or more aspects of the present invention are inextricably tied to computer technology and facilitate processing within a computer, improving performance thereof. Further details of one embodiment of facilitating processing within a computing environment, as it relates to one or more aspects of the present invention, are described with reference to FIGS. 6A-6B.

Referring to FIG. 6A, in one example, a determination is made as to whether a rate of prefetching of data from memory into a cache is to be changed (600). This determining is based, for instance, on bus utilization (602). Based on determining that the rate is to be changed, the rate of prefetching is changed (604). As examples, the changing the rate of prefetching includes slowing the rate of prefetching (606) or increasing the rate of prefetching (608). In another example, the changing the rate of prefetching includes receiving a prefetch request at a cache hierarchy having a plurality of levels of cache (610), and blocking the prefetch request from being sent to one or more levels of cache of the plurality of levels of cache (612). In one example, the blocking includes blocking the prefetch request from being sent from a private level cache to a shared level cache of the plurality of levels of cache (614).

Further, in one example, referring to FIG. 6B, the determining whether a rate of prefetching of data from memory into a cache is to be changed includes obtaining an indication of a selected bus used in the prefetching of data to be monitored (620), monitoring utilization of the selected bus (622), and determining whether the rate of prefetching is to be changed based on the monitoring (624). As an example, the selected bus is a bus determined to be most utilized in the prefetch of data for a particular request (626). Further, in one example, the monitoring is performed for a selected number of prefetch requests (628).

Moreover, in one embodiment, the monitoring includes obtaining information relating to utilization (630), and the information includes, for instance, an indication of bus utilization for prefetch requests (632) and/or an indication of bus utilization for demand requests (634). Other variations are also possible.

Many variations are possible without departing from a spirit of aspects of the present invention. It should be noted that various aspects and features are described herein, and unless otherwise inconsistent, each aspect or feature may be combinable with any other aspect or feature.

Figure 7A:
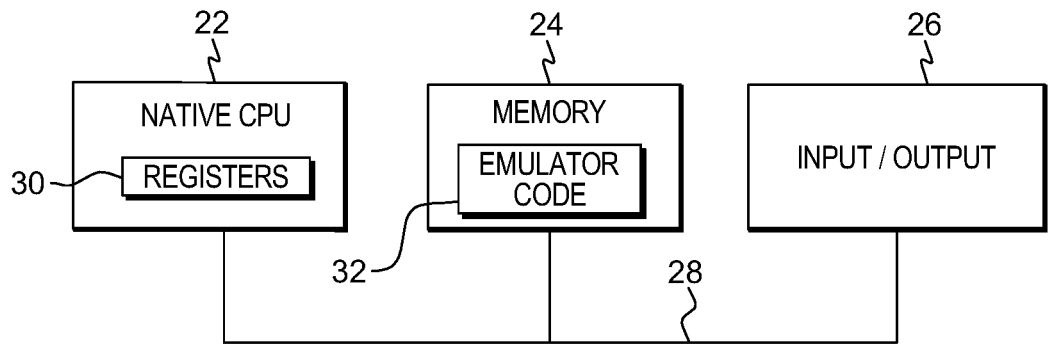
FIG. 7A depicts another example of a computing environment to incorporate and use one or more aspects of the present invention.

Other types of computing environments may also incorporate and use one or more aspects of the present invention, including, but not limited to, emulation environments, an example of which is described with reference to FIG. 7A. In this example, a computing environment 20 includes, for instance, a native central processing unit (CPU) 22, a memory 24, and one or more input/output devices and/or interfaces 26 coupled to one another via, for example, one or more buses 28 and/or other connections. As examples, computing environment 20 may include a PowerPC processor or a pSeries server offered by International Business Machines Corporation, Armonk, N.Y.; and/or other machines based on architectures offered by International Business Machines Corporation, Intel, or other companies.

Native central processing unit 22 includes one or more native registers 30, such as one or more general purpose registers and/or one or more special purpose registers used during processing within the environment. These registers include information that represents the state of the environment at any particular point in time.

Moreover, native central processing unit 22 executes instructions and code that are stored in memory 24. In one particular example, the central processing unit executes emulator code 32 stored in memory 24. This code enables the computing environment configured in one architecture to emulate another architecture. For instance, emulator code 32 allows machines based on architectures other than the z/Architecture, such as PowerPC processors, pSeries servers, or other servers or processors, to emulate the z/Architecture and to execute software and instructions developed based on the z/Architecture.

Figure 7B:
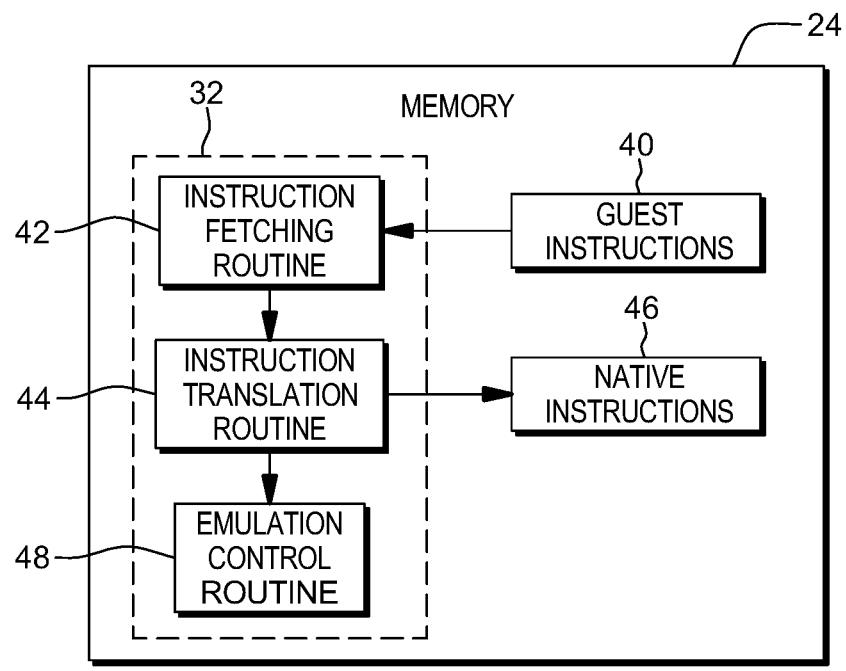
FIG. 7B depicts further details of the memory of FIG. 7A.

Further details relating to emulator code 32 are described with reference to FIG. 7B. Guest instructions 40 stored in memory 24 comprise software instructions (e.g., correlating to machine instructions) that were developed to be executed in an architecture other than that of native CPU 22. For example, guest instructions 40 may have been designed to execute on a z/Architecture processor, but instead, are being emulated on native CPU 22, which may be, for example, an Intel processor. In one example, emulator code 32 includes an instruction fetching routine 42 to obtain one or more guest instructions 40 from memory 24, and to optionally provide local buffering for the instructions obtained. It also includes an instruction translation routine 44 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 32 includes an emulation control routine 48 to cause the native instructions to be executed. Emulation control routine 48 may cause native CPU 22 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 46 may include loading data into a register from memory 24; storing data back to memory from a register; or performing some type of arithmetic or logic operation, as determined by the translation routine.

Each routine is, for instance, implemented in software, which is stored in memory and executed by native central processing unit 22. In other examples, one or more of the routines or operations are implemented in firmware, hardware, software or some combination thereof. The registers of the emulated processor may be emulated using registers 30 of the native CPU or by using locations in memory 24. In embodiments, guest instructions 40, native instructions 46 and emulator code 32 may reside in the same memory or may be disbursed among different memory devices.

As used herein, firmware includes, e.g., the microcode or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 40 that is obtained, translated and executed may be, for instance, one of the instructions described herein. The instruction, which is of one architecture (e.g., the z/Architecture), is fetched from memory, translated and represented as a sequence of native instructions 46 of another architecture (e.g., PowerPC, pSeries, Intel, etc.). These native instructions are then executed.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 8:
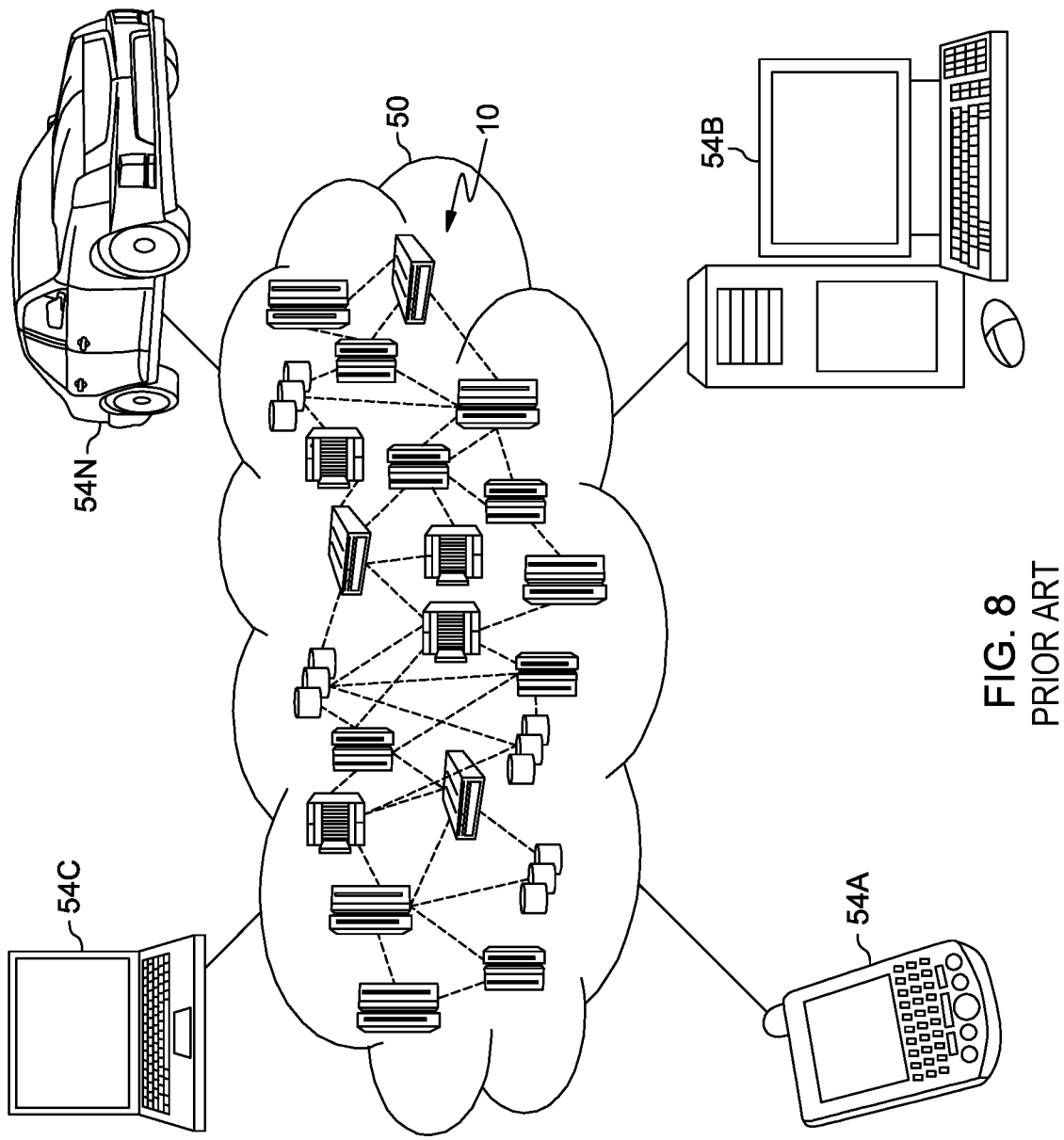
FIG. 8 depicts one embodiment of a cloud computing environment.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
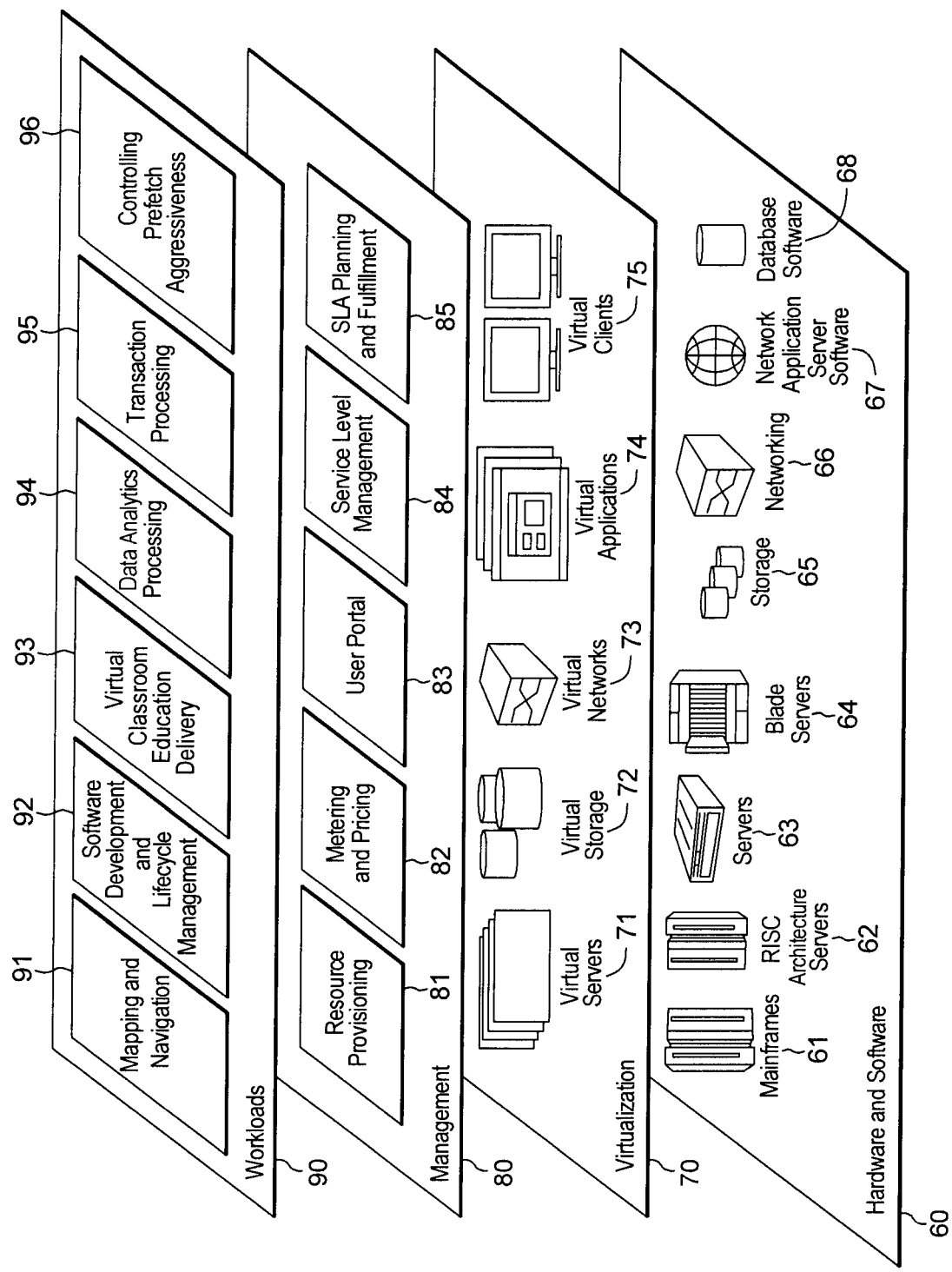
FIG. 9 depicts one example of abstraction model layers.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and prefetching aggressiveness control processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different memory and/or cache hierarchies may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, said computer program product comprising:
    a computer readable storage medium readable by a processing circuit and storing instructions for performing a method comprising:
        determining whether a rate of prefetching of data from memory into a cache is to be changed, wherein the determining is based on bus utilization, and differentiates utilization due to demand requests and prefetch requests, and the determining comprises:
            identifying a most utilized bus of a plurality of buses used for the prefetch of data;
            monitoring utilization of the most utilized bus, the monitoring including obtaining utilization of the most utilized bus due to requests, the requests including at least one of the demand requests or the prefetch requests; and
            determining whether the rate of prefetching is to be changed based on the monitoring, wherein the determining whether the rate of prefetching is to be changed based on the monitoring includes using the indication of bus utilization due to the requests in determining whether the rate of prefetching is to be changed; and
        changing the rate of prefetching, based on determining that the rate is to be changed.

2. The computer program product of claim 1, wherein the changing the rate of prefetching comprises slowing the rate of prefetching.

3. The computer program product of claim 1, wherein the changing the rate comprises increasing the rate of prefetching.

4. The computer program product of claim 1, wherein the changing the rate of prefetching comprises:
    receiving a prefetch request at a cache hierarchy having a plurality of levels of cache; and
    blocking the prefetch request from being sent to one or more levels of cache of the plurality of levels of cache.

5. The computer program product of claim 4, wherein the blocking the prefetch request comprises blocking the prefetch request from being sent from a private level cache to a shared level cache of the plurality of levels of cache.

6. The computer program product of claim 1, wherein the monitoring is performed over a selected number of prefetch requests, and includes determining an average max utilization for the most utilized bus over the selected number of prefetch requests.

7. The computer program product of claim 1, wherein the monitoring includes:
obtaining for the most utilized bus an indication of bus utilization due to prefetch requests; and
wherein the determining whether the rate of prefetching is to be changed based on the monitoring includes using the indication of bus utilization due to prefetch requests in determining whether the rate of prefetching is to be changed.

8. The computer program product of claim 7, wherein the using includes comparing the indication of bus utilization due to prefetch requests to a bus utilization threshold.

9. The computer program product of claim 1, wherein the monitoring includes:
obtaining for the most utilized bus an indication of bus utilization due to demand requests; and
wherein the determining whether the rate of prefetching is to be changed based on the monitoring includes using the indication of bus utilization due to demand requests and determining whether the rate of prefetching is to be changed.

10. The computer program product of claim 9, wherein the using includes comparing the indication of bus utilization due to demand requests to a bus utilization threshold.

11. A computer system for facilitating processing within a computing environment, the computer system comprising:
a memory; and
at least one processor in communication with the memory, wherein the computer system is configured to perform a method, the method comprising:
determining whether a rate of prefetching of data from memory into a cache is to be changed, wherein the determining is based on bus utilization, and differentiates utilization due to demand requests and prefetch requests, and the determining comprises:
identifying a most utilized bus of a plurality of buses used for the prefetch of data;
monitoring utilization of the most utilized bus, the monitoring including obtaining utilization of the most utilized bus due to requests, the requests including at least one of the demand requests or the prefetch requests; and
determining whether the rate of prefetching is to be changed based on the monitoring, wherein the determining whether the rate of prefetching is to be changed based on the monitoring includes using the indication of bus utilization due to the requests in determining whether the rate of prefetching is to be changed; and
changing the rate of prefetching, based on determining that the rate is to be changed.

12. The computer system of claim 11, wherein the changing the rate of prefetching comprises:
receiving a prefetch request at a cache hierarchy having a plurality of levels of cache; and
blocking the prefetch request from being sent to one or more levels of cache of the plurality of levels of cache.

13. The computer system of claim 12, wherein the blocking the prefetch request comprises blocking the prefetch request from being sent from a private level cache to a shared level cache of the plurality of levels of cache.

14. The computer system of claim 11, wherein the changing the rate of prefetching comprises slowing the rate of prefetching.

15. The computer system of claim 11, wherein the changing the rate comprises increasing the rate of prefetching.

16. The computer system of claim 11, wherein the monitoring is performed over a selected number of prefetch requests, and includes determining an average max utilization for the most utilized bus over the selected number of prefetch requests.

17. The computer system of claim 11, wherein the monitoring includes:
obtaining for the most utilized bus an indication of bus utilization due to prefetch requests; and
wherein the determining whether the rate of prefetching is to be changed based on the monitoring includes using the indication of bus utilization due to prefetch requests in determining whether the rate of prefetching is to be changed.

18. The computer system of claim 17, wherein the using includes comparing the indication of bus utilization due to prefetch requests to a bus utilization threshold.

19. The computer system of claim 11, wherein the monitoring includes:
obtaining for the most utilized bus an indication of bus utilization due to demand requests; and
wherein the determining whether the rate of prefetching is to be changed based on the monitoring includes using the indication of bus utilization due to demand requests in determining whether the rate of prefetching is to be changed.

20. A computer-implemented method of facilitating processing within a computing environment, said computer-implemented method comprising:
determining whether a rate of prefetching of data from memory into a cache is to be changed, wherein the determining is based on bus utilization, and differentiates utilization due to demand requests and prefetch requests, and the determining comprises:
identifying a most utilized bus of a plurality of buses used for the prefetch of data;
monitoring utilization of the most utilized bus, the monitoring including obtaining utilization of the most utilized bus due to requests, the requests including at least one of the demand requests or the prefetch requests; and
determining whether the rate of prefetching is to be changed based on the monitoring, wherein the determining whether the rate of prefetching is to be changed based on the monitoring includes using the indication of bus utilization due to the requests in determining whether the rate of prefetching is to be changed; and
changing the rate of prefetching, based on determining that the rate is to be changed.

* * * * *